United States Patent
Dai et al.

(10) Patent No.: US 6,704,880 B2
(45) Date of Patent: Mar. 9, 2004

(54) REDUCING SLEEP MODE SUBTHRESHOLD LEAKAGE IN A BATTERY POWERED DEVICE BY MAKING LOW SUPPLY VOLTAGE LESS THAN TWICE THE THRESHOLD VOLTAGE OF ONE DEVICE TRANSISTOR

(75) Inventors: Xia Dai, Santa Clara, CA (US); Borys S. Senyk, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 43 days.

(21) Appl. No.: 09/978,644

(22) Filed: Oct. 18, 2001

(65) Prior Publication Data

US 2002/0026597 A1 Feb. 28, 2002

Related U.S. Application Data

(62) Division of application No. 09/161,076, filed on Sep. 25, 1998, now Pat. No. 6,347,379.

(51) Int. Cl.[7] .................................................. G06F 1/32
(52) U.S. Cl. ...................................... 713/323; 327/544
(58) Field of Search ........................... 713/323; 327/544

(56) References Cited

U.S. PATENT DOCUMENTS

| | | | | |
|---|---|---|---|---|
| 5,656,946 A | * | 8/1997 | Sim ............................. | 326/21 |
| 5,801,585 A | * | 9/1998 | Roohparvar ................. | 327/544 |
| 6,163,044 A | * | 12/2000 | Manning .................... | 257/299 |
| 6,333,571 B1 | * | 12/2001 | Teraoka et al. ............. | 307/125 |
| 6,333,874 B2 | * | 12/2001 | Yamauchi ............... | 365/189.09 |
| 6,552,601 B1 | * | 4/2003 | Burr ........................... | 327/537 |

OTHER PUBLICATIONS

IBM Technical Disclosure Bulletin, "Leakage Current Reduction/Minimization through Substrate and/or Well Bias Control Coupled with Clock Power Management", vol. 41, No. 1, pp. 547–549, Jan. 1998.*

A. Bellaouar, A. Fridi, M.I. Elmasry, and K. Itoh, "Supply Voltage Scaling for Temperature Insensitive CMOS Circuitr Operation", IEEE Transactions on Circuits and Systems—II: Analog and Digital Signal Processing, vol. 45, No. 3, pp. 415–417, Mar. 1998.*

A. Dancy and A. Chandrakasan, "Techniques for Aggressive Supply Voltage Scaling and Efficient Regulation", Proceedings of the IEEE 1997 Custom Integrated Circuits Conference, pp. 579–586, May 5–8, 1997.*

R. Gonzalez, B.M. Gordon, and M.A. Horowitz, "Supply and Threshold Voltage Scaling for Low Power CMOS", IEEE Journal of Solid–State Circuits, vol. 32, No. 8, pp. 1210–1216, Aug. 1997.*

* cited by examiner

*Primary Examiner*—Thomas Lee
*Assistant Examiner*—Albert Wang
(74) *Attorney, Agent, or Firm*—Trop, Pruner & Hu, P.C.

(57) ABSTRACT

Leakage power consumption may be reduced in computers and other devices by providing a state where clocks are off and a low supply voltage is provided to the processor. This voltage may be sufficiently low to prevent adverse consequences while dramatically reducing leakage current. In addition, caches may be flushed to reduce the soft error rate.

8 Claims, 4 Drawing Sheets

REDUCING SLEEP MODE SUBTHRESHOLD LEAKAGE IN A BATTERY POWERED DEVICE BY MAKING LOW SUPPLY VOLTAGE LESS THAN TWICE THE THRESHOLD VOLTAGE OF ONE DEVICE TRANSISTOR

This is a divisional of prior application Ser. No. 09/161,076 filed Sep. 25, 1998, now U.S. Pat. No. 6,347,379.

BACKGROUND

This invention relates generally to reducing the amount of power consumed in a reduced dynamic power consumption state by a variety of electronic devices including those that use battery power sources, such as portable computers.

In devices such as computers that may be operated from a battery, it is important to reduce the power consumption to the greatest possible extent. The usefulness of battery operated devices is reduced if the battery must be recharged frequently. A variety of techniques are known for reducing the dynamic power consumption. For example the Advanced Configuration and Power Interface (ACPI) Specification, (Rev. 1.0, Dec. 22, 1996) sets forth information about how to reduce the dynamic power consumption of portable and other computer systems.

With respect to the microprocessors used in computer systems, four processor power consumption states (C0–C3) are defined in the ACPI Specification. When the processor is executing instructions it is in a C0 state. There are three non-executing states (C1–C3). In a working computer system, the operating system dynamically transitions idle processors into the appropriate power consumption state.

State C1 is the processor power state with the lowest latency. Basically, aside from putting the processor in a non-executing power state, the C1 state has no other software visible effects.

The C2 power state offers improved power savings over the C1 state. Like the C1 state, aside from putting the processor in a non-executing power state, the state has no other software visible effects. In the C2 power state, the processor is still able to maintain the context of the system caches.

The C3 power state offers still lower dynamic power consumption compared to the C1 and C2 states. While in the C3 state, the processor's caches are maintained but snoops are ignored. The operating system software is responsible for ensuring that cache coherency is maintained. In the C3 state, the processor may not be able to maintain coherency of the processor caches with respect to other system activities. The C3 power consumption state uses less power but has a higher exit latency than the C2 power state.

Generally, the C3 state uses one of two mechanisms to maintain cache coherency. The operating system may flush and invalidate the caches prior to entering the C3 state. The flushing of the caches may be provided through predefined ACPI mechanisms. Alternatively hardware mechanisms may be provided to prevent bus masters from writing to memory. In processors that use hardware mechanisms, the bus masters may be disabled prior to entering the C3 state. When a bus master requests an access, the processor awakens from the C3 state and re-enables bus master access.

While the reduced power consumption states outlined by the ACPI Specification and known techniques have many advantages, there are instances where greater power consumption reductions may be desired. Thus, there is a continuing need for ways to further reduce the power consumption of computer systems and other components including devices which are operated from batteries.

SUMMARY

In accordance with one embodiment, a method of reducing the power consumed by an electronic device using a clock signal includes disabling the clock signal and reducing the leakage power consumption of the device.

DETAILED DESCRIPTION

The power consumption of an electronic device may be made up of two components. The dynamic power consumption relates to the power that is consumed when the device is operating. In connection with processors, the dynamic power consumption occurs when the processor's clocks are operating. The leakage power consumption may occur when the device is not operating and power continues to be consumed based on the leakage current which flows through the transistors, in the off state, that make up the electronic device.

Leakage power consumption may derive from weak inversion and the finite impedance between the source and drain of complementary metal oxide semiconductor (CMOS) transistors when the transistors are in the off state. This leakage current, which is sometimes also called sub-threshold leakage, has an exponential dependency on threshold voltage divided by thermal energy (kT).

The threshold voltage may be determined by process conditions, temperature and channel length. As a rule of thumb, the leakage current doubles for every 15° C. increase in temperature. Moreover, as process technologies continue to scale, the threshold voltage and channel length become smaller. As a result, the leakage current, and thus the leakage power consumption, increases for each process generation.

Due to the short channel effect with sub-micron channel lengths, leakage current may have a sub-linear dependency on supply voltage. In other words, the leakage current decreases sub-linearly as supply voltage decreases.

Gate leakage due to a tunneling effect may also cause leakage current. The tunneling current has an exponential dependency on supply voltage.

In portable computers with battery operation, the increased leakage power consumption may have a direct impact on battery life. Leakage current may be a limiting factor for threshold voltage scaling in battery operated devices.

Figure 1:
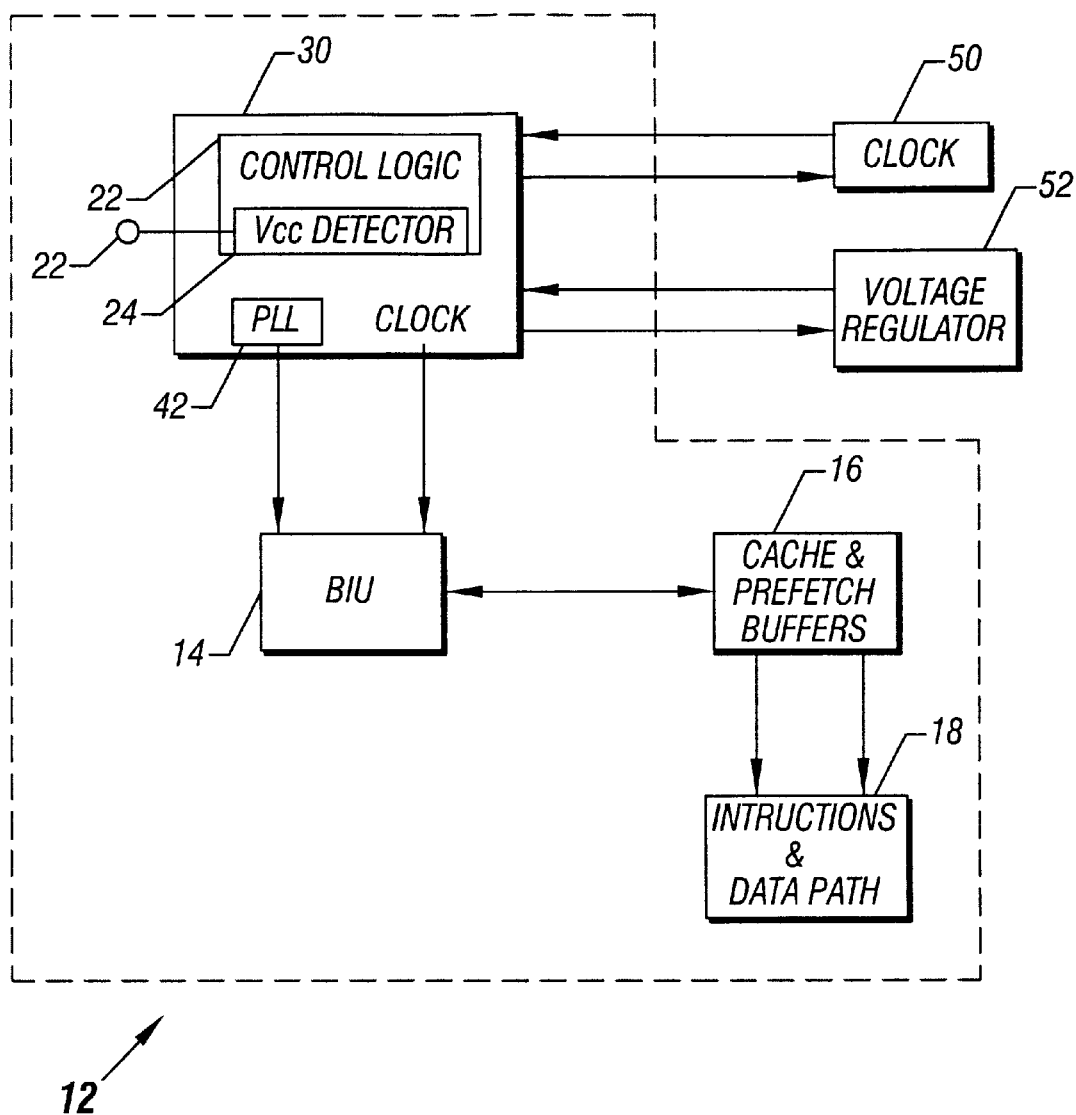
FIG. 1 is a block diagram showing a processor core in accordance with one embodiment of the present invention.

Referring now to FIG. 1, an architecture for one illustrative embodiment of a microprocessor 12 implementing an embodiment of the present invention includes a clock generator 30 and a bus interface unit (BIU) 14. The BIU 14 is coupled to cache and prefetch buffers 16 which may include a branch target buffer (BTB). The caches may store instructions and data for execution by the processor 12. Prefetch buffers may be coupled to a cache to enable prefetching of data and instructions from the cache or from the BIU 14 for execution by the processor 12.

The cache and prefetch buffers 16 may be coupled to an instruction and data path section 18. The instruction and data path section 18 may include an instruction decoder that decodes the incoming instructions. A microcode unit may contain a memory which stores the microcode instructions for the processor. The data path is the main execution path for the processor. It may contain an arithmetic logic unit register file, barrel shifter, constant read only memory and flags. The processor may also include a floating point unit (not shown).

The clock unit 30 generates the clock signals for the processor 12. The clock unit 30 may, for example, generate the clock signals in response to an external frequency clock input. The clock unit 30 supplies the clock signals to the BIU 14 and to the remaining units of the processor as well.

The clock unit 30 also includes control logic 22 for controlling the operation of the clock unit 50. The control logic 22 may include a Vcc detector 24 which monitors the supply voltage level and issues a reset signal if the voltage level becomes too low. The clock generator 12 also includes the phase locked loop (PLL) 42 which communicates with the BIU 14.

The frequency of the internal clock may be controlled through signals generated by an external clock 50 such as the bus clock signal BCLK in processors made by Intel Corporation. That is, the internal clock may be sped up or slowed down based on the input clock signal from the clock 26.

In addition a voltage regulator 52 selectively provides one of two supply voltage levels to the clock unit 30 and the rest of the processor 12. The voltage regulator 52 may receive two reference voltages. The higher reference voltage may be a conventional external supply voltage in accordance with the particular technology being utilized. The lower reference voltage may be the low power supply voltage to reduce leakage power consumption.

Figure 2:
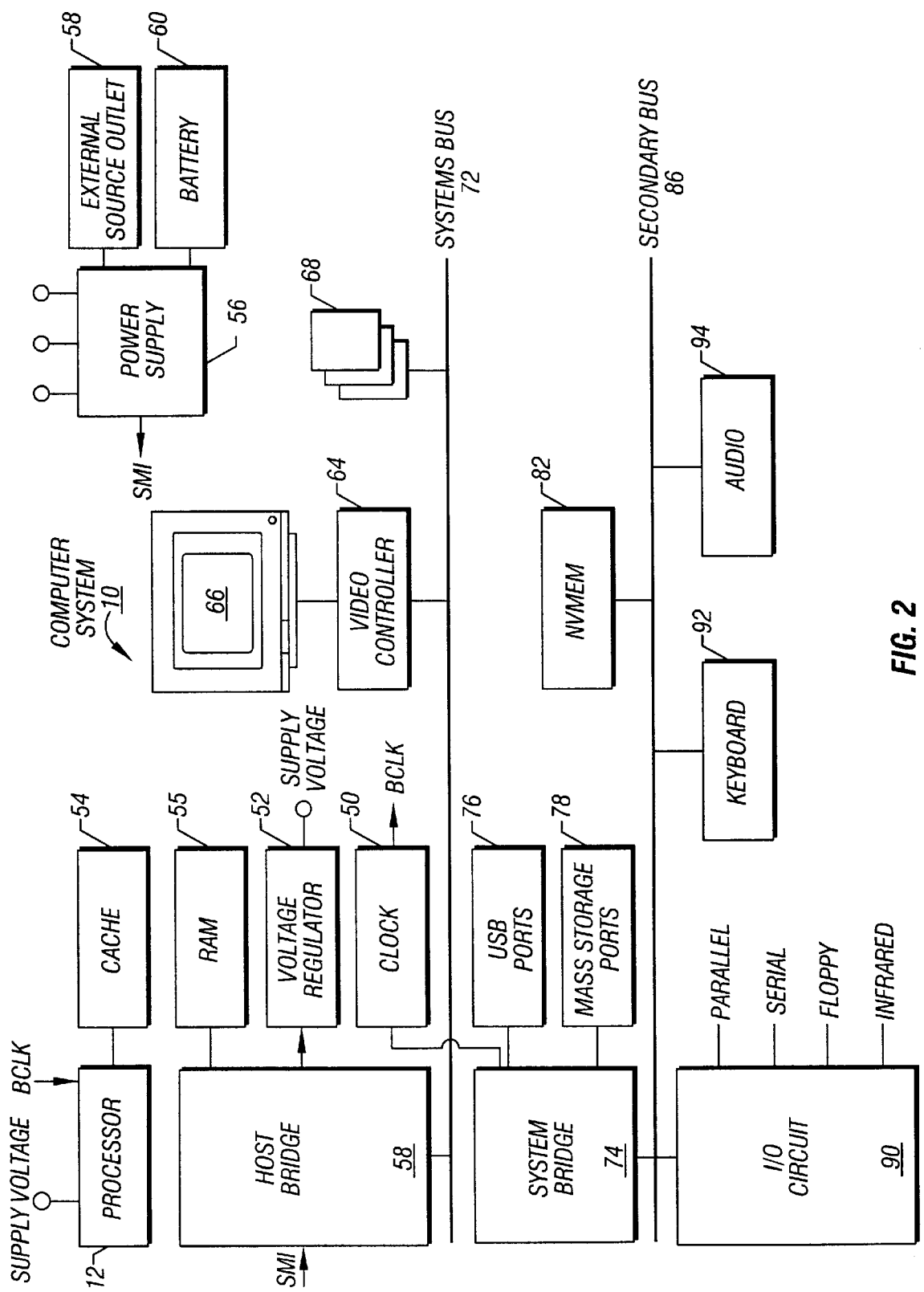
FIG. 2 is a block diagram of a computer system including the processor illustrated in FIG. 1.

Referring to FIG. 2, an example computer system 10 includes a processor 12 (e.g., an 80x86 or Pentium® processor from Intel Corporation) that receives an external clock BCLK (from a clock generator 50) and a supply voltage (from a voltage regulator 52). The voltage regulator 52 and the clock generator 50 are both controllable to adjust the core voltage levels as well as the core clock frequencies in the processor 12, as further described below.

The main power supply voltages in the computer system 10 are provided by a power supply circuit 56 that is coupled to a battery 60 and an external power source port 50. When the external power source (not shown) is plugged in or removed, an interrupt (e.g., system management interrupt or SMI) may be generated to notify system software of the external power source insertion or removal. In addition, docking the computer system 10 to a docking base unit may also indicate a power source transition. In one embodiment, a device driver may detect power source transitions and docking events by registering with the operating system for power and plug-and-play notifications, for example.

The processor 12 may be coupled to a cache memory 54 as well as to a host bridge 58 that includes a memory controller for controlling system memory 55. The host bridge 58 may also by coupled to a system bus 72, which may in one embodiment be a peripheral component interconnect (PCI) bus, as defined in the PCI Local Bus Specification, Production Version, Rev. 2.1, published on Jun. 1, 1995. The system bus 72 may couple other components, including a video controller 64 coupled to a display 66 and peripheral slots 68. A secondary or expansion bus may be coupled by system bridge 74 to the system bus 72. The system bridge includes interface circuits to different ports, including a universal serial bus (USB) port 76 and mass storage ports connectable to mass storage devices such as a hard disk drive.

Other components coupled to the secondary bus 86 include an input/output (I/O) circuit 90 that may couple to a parallel port, serial port, floppy drive, and infrared port. A non-volatile memory 82 for storing basic input/output system (BIOS) routines may be located on the bus 86, as may a keyboard device 92 and an audio control device 94, as examples.

Figure 3:
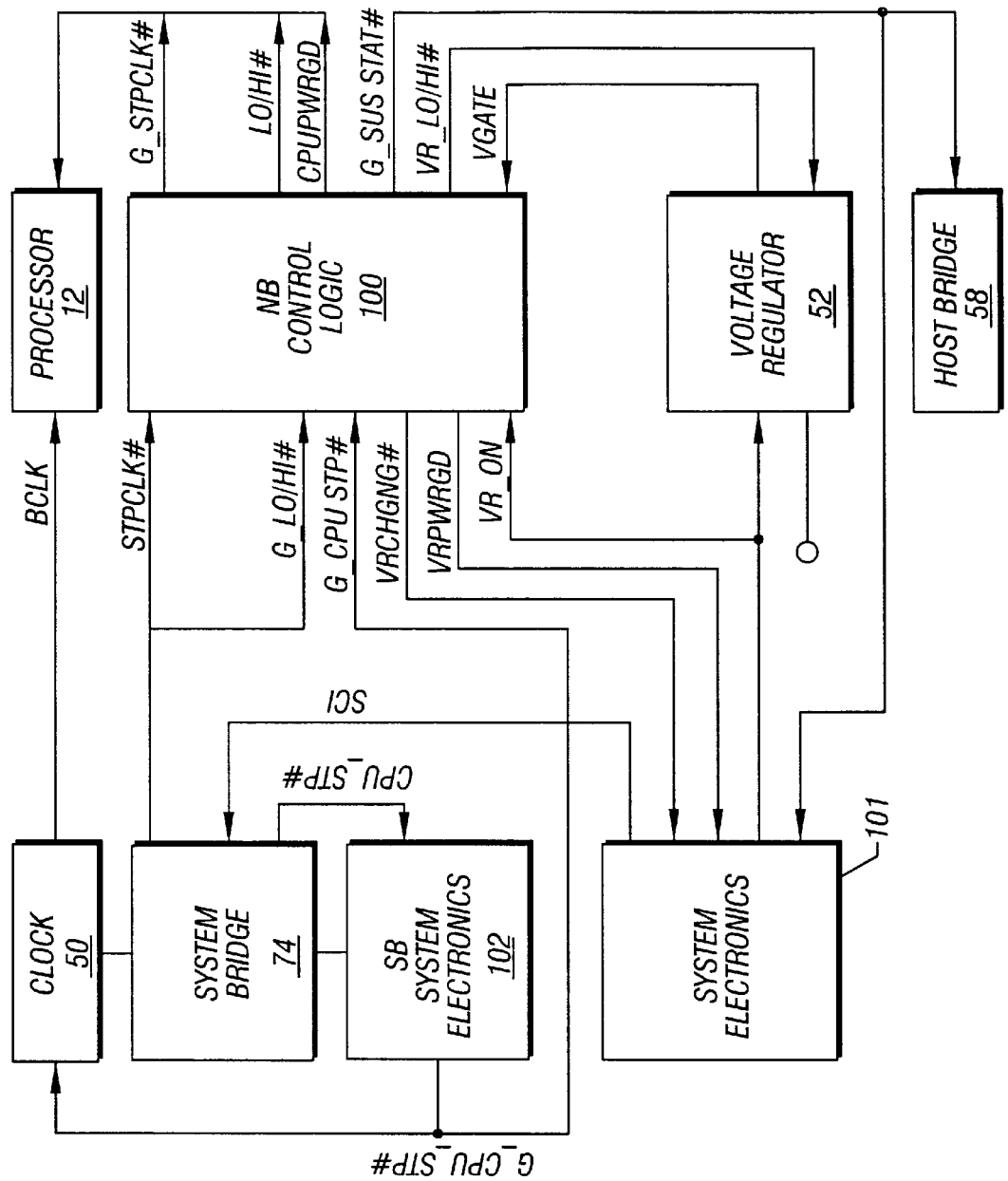
FIG. 3 shows a block diagram of a power management control circuit in accordance with one embodiment of the present invention.

Referring to FIG. 3, an illustrative power management control logic according to an embodiment for controlling the core clock frequency and the supply voltage level to the processor 12 may be separated into a first portion 100 and a second portion 102. However, the first control logic portion 100 may be included in the host bridge 58 and the second control logic portion 102 may be included in the system bridge 74. Alternatively, the first and second control logic portions may be implemented as separate chips.

The control logic 100, 102 provide control signals to the voltage regulator 52 to adjust its voltage levels and to the processor 12 to adjust the processor's internal clock frequency. In addition, the power management control logic 100, 102 may transition the processor 12 into a reduced power consumption state.

A brief description of the interface signals between the power management control logic 100, 102 and the other components of the system follows. The signal LO/HI# provided by the control logic 100 to the processor 12 determines if a core clock frequency of the processor 12 is at a high or low level. As an example, the core clock frequency may vary between 350 MHz and 450 MHz depending on whether LO/HI# is active or not. Additional bits may be used to adjust the core clock frequency to more than two levels.

A signal VR_LO/HI# is provided by the control logic portion 100 to the voltage regulator 52 to adjust the voltage level supplied by the voltage regulator 52. Additional bits other than VR_LO/HI# may also be used to provide additional voltage levels.

A signal G_STPCLK# may be provided to the processor 12 and a signal G_CPU_STP# may be provided to the clock generator 50 to place the processor 12 in a reduced dynamic power consumption state (e.g., deep sleep, stop grant, C2, or C3 state) so that the clock frequency and supply voltage level of the processor 12 may be varied.

A signal VRCHGNG# is provided by the control logic 100 to system electronics circuitry 101 (e.g., the host bridge 58 and system bridge 74) to indicate that the voltage level from the voltage regulator 52 is changing. A signal VRPWRGD from the control logic portion 100 to system electronic circuitry (e.g., the host bridge 58 and system bridge 74) indicates when the output from the voltage regulator 52 is within specification.

According to one embodiment of the invention, when the voltage regulator on signal (VR_ON) is active (which is true whenever the system is on), the voltage regulator 52 settles to the output selected by VR_LO/HI# (a low level or a high level). When the outputs of the regulator 52 are on and within specification, the voltage regulator 52 asserts a signal VGATE, which in turn controls the state of the signal VRPWRGD provided by the control logic portion 100 to system electronics circuitry.

Figure 4:
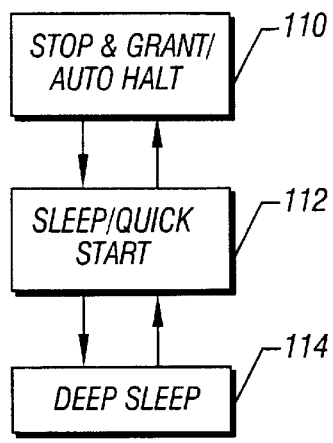
FIG. 4 is a chart showing the different prior art power consumption states.

Referring to FIG. 4, the conventional processor power management modes for an Intel architecture processor are illustrated. The blocks 110–114 correspond to the ACPI Specification processor power consumption states C1–C3 respectively. In the Intel architecture processors, the C1 mode is called the stop and grant/autohalt mode. In this state most functional blocks of the processor are turned off by disabling clocks. The phase locked loop (PLL) and the global clock spine are left running. Some functional blocks are left running to support bus activity and snooping.

In block 112, called "sleep" mode in desktops and "quickstart" in mobile computer systems using Intel architecture, all the functional blocks and most of the input/output devices are turned off. The PLL, global clock spine and a few I/O devices are kept running.

In block 114 the ACPI processor power consumption state C3 (also called the deep sleep state in the Intel architecture) is illustrated. In this state, the PLL is off. All the functional blocks stop running, but the registers and caches maintain their contents.

Figure 5:
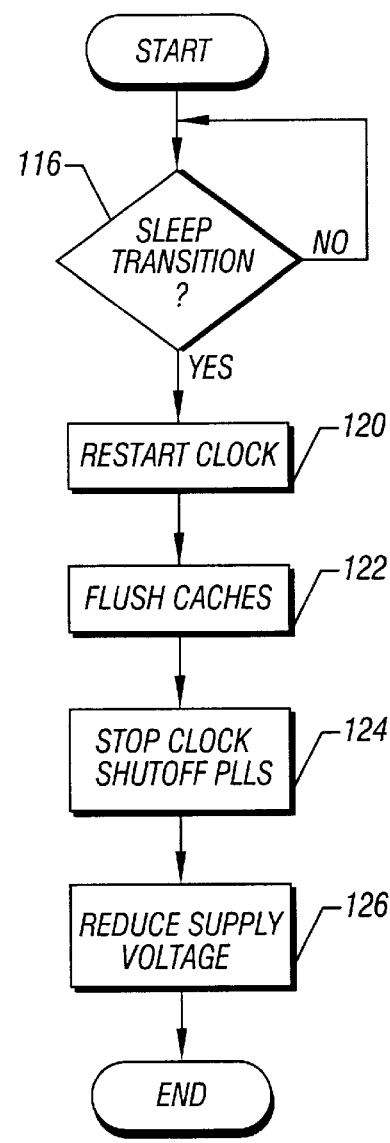
FIG. 5 shows a flow for reducing leakage power consumption.

Referring now to FIG. 5, the transition to a modified deep sleep state corresponding to a modified state C3 of the ACPI Specification is illustrated. Initially a check at diamond 116 determines whether a transition to the C3 state is appropriate. This may occur based on inactivity or other triggering events as set forth for example in the ACPI Specification. Normally the transition to the C3 state would occur in a device which is already in the C2 state. When the transition occurs, the processor clock may be restarted, as indicated in block 120. This may be accomplished by asserting G_STPCLK#. Since the clock was stopped before entering the C3 state, it is restarted to flush the caches. Next the caches, such as the L2, L1 and BTB caches, are flushed as indicated in block 122.

The reason for flushing the caches is to reduce the soft error rate (SER). A soft error occurs as a result of particles, such as alpha particles, which cause charges to be formed in semiconductor devices. With relatively low supply voltages, the rate of soft errors increases dramatically. Therefore a flush instruction is used to flush caches such as the L2 cache, the L1 cache and the BTB. After the caches are flushed, as indicated in block 122, the clock may then be stopped and the PLL is shut off, as indicated in block 124. This may be accomplished by deasserting G_STPCLK#.

Next the supply voltage transitions to a low supply voltage as indicated in block 126. This may be done by asserting the low level of VR_LO/HI#. Generally the supply voltage of the device is lowered to 100 mV to 150 mV above the threshold voltage (including an adjustment for process variation) at room temperature of the n-type metal oxide semiconductor (NMOS) or p-type metal oxide semiconductor (PMOS) transistors, whichever is larger. The supply voltage transitions in response to a signal that implements the transition to the C3 processor state. This transition signal causes the low reference signal to control the voltage regulator 52.

The exact level of the low supply voltage depends on the threshold voltage spread and the process control with a particular technology. A low supply voltage is used that is sufficient to maintain all the internal registers of the device so that they retain their contents while avoiding floating nodes.

Thus, an adjustment due to process variations may be added to the threshold voltage. A gate overdrive voltage may be added to that voltage to avoid floating nodes. Finally a guard band voltage for the power supply may be included, which in an exemplary embodiment may be 10% of the sum of the threshold voltage, the threshold voltage adjustment for process variations and the gate overdrive voltage. The low supply voltage level may then be made up of the sum of the threshold voltage, the process variation adjustment, the gate overdrive voltage and the guard band voltage for the power supply. In one exemplary embodiment, the threshold voltage may be 350 mV, the threshold voltage variation may be 50 mV, the gate overdrive voltage may be 100 mV and the guard band voltage may be 50 mV, resulting in a low supply voltage of approximately 550 mV.

In general, the low supply voltage is less than twice a transistor threshold voltage. In one advantageous embodiment the low supply voltage may be less than or equal to about 600 mV. In another advantageous embodiment, the low supply voltage is about 200 mV above a transistor threshold voltage. Also it may be advisable in some embodiments to reduce the leakage power consumption to less than or equal to 25% of what it would be at a conventional supply voltage level for a given technology.

In some processors, including Intel architecture processors, when the internal processor voltage falls below a certain level, the CPUPWRGD signal is deasserted. When the CPUPWRGD signal is asserted again, the processor automatically starts a reset sequence. It is desirable to avoid the reset sequence because reset destroys the processor register contents.

The power good (PWRGOOD) signal generated in Intel architecture processors is the logical AND of the external power good and the internal power good signals. There is a power good input pin on Intel architecture processors. The power good signal is not latched and enables the PLL circuitry. The internal power good signal, generated from voltage detection circuitry 24, trips when the internal supply voltage (Vcc) is below a certain voltage level, which then shuts off the PLL. Since the internal supply voltage (Vcc) is raised before the PLL starts to lock to the external clock, the power good signal will be normal before the PLL starts to lock to the external clock.

There are at least two ways to prevent glitching of the power good signal during the modified deep sleep state. The internal power good may be gated by a signal which is the logical AND of a signal indicating whether the computer has a modified deep sleep state and a signal indicating that the modified deep sleep state has been entered.

Alternatively, the Vcc detector 24 may be disabled (for example by asserting the PLLIDDQ pin 22 in Intel® processors) during the modified deep sleep state. A disable signal (e.g., PLLIDDQ) may be used to disable the Vcc detector during a D.C. current test for shorts, called an IDDQ test. This Vcc detector disable signal may also be used to disable the Vcc detector to avoid the reset when the voltage is deliberately lowered to reduce leakage power consumption. Once the Vcc detector is disabled, the reset is not generated when the voltage level is decreased.

Some I/O circuitry may need to use a separate power rail in order to avoid triggering a false signal event when the supply voltage is lowered. I/O signals like data and address do not need to have a separate power rail because they are not sampled during the modified deep sleep state.

Through the techniques described herein leakage power consumption may be reduced through reduced leakage current and supply voltage, since leakage power is a function of leakage current times supply voltage. Due to the sublinear dependency of leakage current on voltage, the leakage power consumption has a square power dependency on voltage. Thus at sufficiently low supply voltages, the reduction of supply voltages during the modified deep sleep state may significantly reduce power consumption.

Latency may be minimized compared to a suspend to RAM state. Exiting the modified deep sleep state may take about 1 to 2 milliseconds while the latency of exiting the suspend to RAM state may be 10 to 20 seconds.

In addition, the soft error rate is reduced because caches are flushed before entering the modified deep sleep state. Since pipelines are drained before entering the modified deep sleep state, latches and domino circuits may be free of soft errors. In at least some embodiments, the only storage elements that are still susceptible to soft errors in the modified deep sleep state are the registers. Thus the soft error rate may be reduced.

Figure 6:
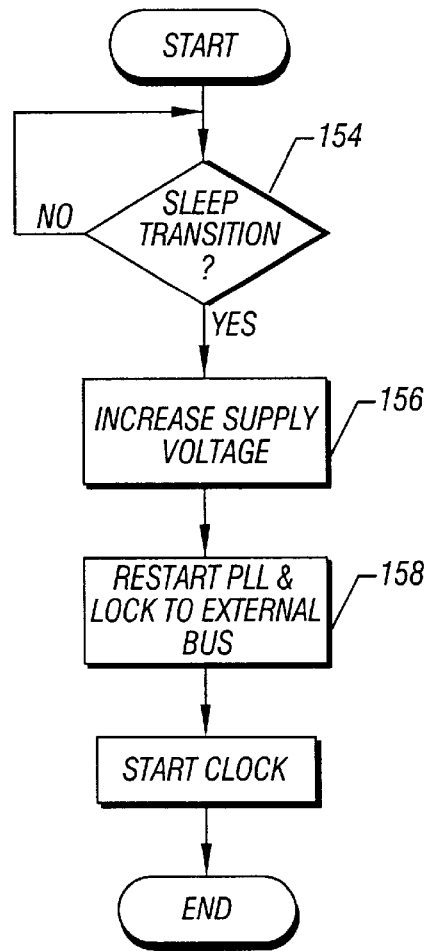
FIG. 6 shows a methodology for transitioning from a reduced leakage power consumption state.

Referring now to FIG. 6, the processor may exit the deep sleep state in response to a sleep transition signal, indicated at diamond 154. In response to the transition signal, for example triggered as set forth in the ACPI Specification, the supply voltage may be increased using the higher voltage reference, as indicated in block 156, for example by asserting the high level of VR_LO/HI#. The PLL may be restarted and locked to the external clock as indicated in block 158 for example by asserting G_STPCLK#. Once the PLL is locked to the external clock, the internal clock 30 may be started as indicated in block 160.

While the present invention has been described with respect to a limited number of embodiments, those skilled in the art will appreciate numerous modifications and variations. It is intended that the appended claims cover all such variations and modifications as fall within the true spirit and scope of the present invention.

What is claimed is:

1. An electronic device comprising:
   a power consuming circuit having transistors, said circuit including first and second voltage supplies, said second voltage supply is about 600 mV or less and is a voltage less than twice the threshold voltage of one of said transistors; and
   a battery voltage coupled to said power consuming circuit.

2. The device of claim 1 adapted to prevent the second supply voltage from triggering a reset.

3. The device of claim 1 wherein said second supply voltage is about 200 mV above said transistor threshold voltage.

4. The device of claim 1 wherein said circuit includes a processor.

5. An electronic device comprising:
   a power consuming circuit having transistors, said circuit including first and second voltage supplies, said second voltage supply is about 200 mV above the threshold voltage of one of said transistors and less than twice the threshold voltage of one of said transistors; and
   a battery voltage coupled to said power consuming circuit.

6. The device of claim 5 wherein said second supply voltage is about 600 mV or less.

7. The device of claim 5 adapted to prevent the second supply voltage from triggering a reset.

8. The device of claim 5 wherein said circuit includes a processor.

* * * * *